United States Patent
King et al.

(10) Patent No.: US 11,408,191 B2
(45) Date of Patent: Aug. 9, 2022

(54) DISPENSERS

(71) Applicant: KING TECHNOLOGY INC., Hopkins, MN (US)

(72) Inventors: Joseph A. King, Wayzata, MN (US); Jeffrey Johnson, Edina, MN (US); Paul Freeberg, South St. Paul, MN (US); David Guy, Maple Grove, MN (US); Terry Goeman, Minnetonka, MN (US)

(73) Assignee: KING TECHNOLOGY INC.

( * ) Notice: Subject to any disclaimer, the term of this patent is extended or adjusted under 35 U.S.C. 154(b) by 14 days.

(21) Appl. No.: 16/974,216

(22) Filed: Nov. 17, 2020

(65) Prior Publication Data

US 2021/0071436 A1    Mar. 11, 2021

Related U.S. Application Data

(62) Division of application No. 15/932,593, filed on Mar. 20, 2018, now Pat. No. 10,914,091, which is a division of application No. 14/544,166, filed on Dec. 4, 2014, now Pat. No. 10,119,287.

(60) Provisional application No. 61/966,354, filed on Feb. 21, 2014.

(51) Int. Cl.
| *E04H 4/12*   | (2006.01) |
| *C02F 1/68*   | (2006.01) |
| *B01F 33/50*  | (2022.01) |
| *C02F 1/76*   | (2006.01) |
| *B01F 21/20*  | (2022.01) |
| *B01F 33/503* | (2022.01) |
| *C02F 103/42* | (2006.01) |

(52) U.S. Cl.
CPC ........... *E04H 4/1281* (2013.01); *B01F 21/22* (2022.01); *B01F 33/503* (2022.01); *C02F 1/688* (2013.01); *C02F 1/76* (2013.01); *C02F 2103/42* (2013.01); *C02F 2201/002* (2013.01); *C02F 2303/04* (2013.01)

(58) Field of Classification Search
CPC ...... E04H 4/1281; B01F 21/22; B01F 33/503; C02F 1/688; C02F 1/76; C02F 2103/42; C02F 2201/002; C02F 2303/04
USPC .......... 210/167.11, 749, 753, 754, 755, 756; 422/265
See application file for complete search history.

(56) References Cited

U.S. PATENT DOCUMENTS

| 4,630,634 A * | 12/1986 | Sasaki ..................... C02F 1/688 |
| | | D23/207 |
| 6,200,487 B1* | 3/2001 | Denkewicz, Jr ...... E04H 4/1281 |
| | | 210/206 |
| 6,432,371 B1* | 8/2002 | Oliver, Jr. ............... C02F 1/688 |
| | | 210/242.1 |

(Continued)

*Primary Examiner* — Fred Prince
(74) *Attorney, Agent, or Firm* — Johnson & Phung LLC

(57) ABSTRACT

A two-part dispensing device for a pool having a dispensing saddle with a static port therein for continual delivery of a first dispersant and a hold for floatingly supporting itself and an exchangeable dispensing pod therein with the dispensing pod having a dynamic port and a static port for a continual delivery of a dispersant wherein the static port delivery of a dispersant maintains the pool at a safe level when there is no human bather load on the pool and the condition of the disperant in the dispensing pod can be determined by the orientation of the dispensing saddle and the dispensing pod in the pool.

6 Claims, 6 Drawing Sheets

(56) References Cited

U.S. PATENT DOCUMENTS

| | | | | |
|---|---|---|---|---|
| 8,544,495 B1* | 10/2013 | Weingart | ............ | A01C 23/042 |
| | | | | 422/264 |
| 8,999,259 B2* | 4/2015 | King | ................ | B01F 33/503 |
| | | | | 210/167.3 |
| 9,039,903 B2* | 5/2015 | King | ................ | B01F 21/22 |
| | | | | 210/764 |
| 2004/0175311 A1* | 9/2004 | Cormier | ................ | A61L 2/23 |
| | | | | 422/40 |
| 2007/0119761 A1* | 5/2007 | King | ................ | E04H 4/1281 |
| | | | | 210/198.1 |
| 2014/0110352 A1* | 4/2014 | King | ................ | C02F 1/688 |
| | | | | 222/173 |

\* cited by examiner

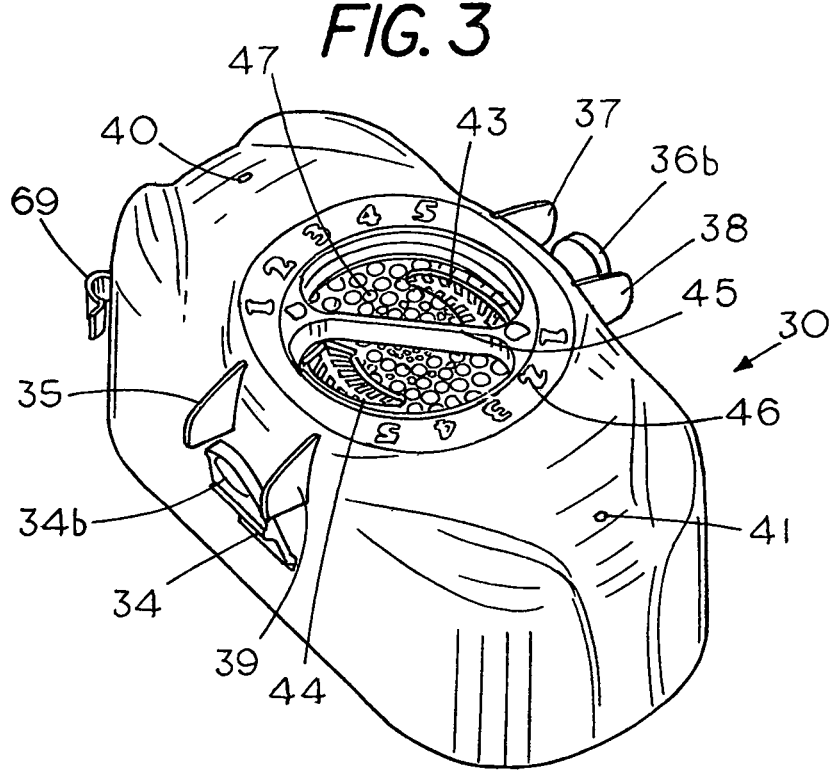

__US 11,408,191 B2__

DISPENSERS

CROSS REFERENCE TO RELATED APPLICATIONS

This application is a division of U.S. patent application Ser. No. 15/932,593 filed Mar. 20, 2018 (pending), which is a division of U.S. patent application Ser. No. 14/544,166 filed Dec. 4, 2014 (now U.S. Pat. No. 10,119,287) and claims priority from provisional application Ser. 61/966,354 filed Feb. 21, 2014.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of floating dispensers for delivering a dispersant to a body of water are known in the art. In one type of floating dispenser the dispenser contains a halogen as it floats upright in a body of water until the halogen is consumed whereupon the dispenser flops on its side. In another type of dispenser the dispenser sinks to the bottom of the pool and remains there until the dispersant has been consumed at which time the dispenser floats to the top of the pool to alert the operator to replace the dispenser. In another type a nondissolvable weight, such as a marble, is included in the dispenser with the dispenser floating on its side when the dispersant is consumed. As the dispenser floats on its side the marble rolls along the interior of the dispenser and transfers the weigh to the end of the dispenser causing to dispenser to invert after the dispersant is consumed.

SUMMARY OF THE INVENTION

A two-part dispensing device for a pool with the two-part dispensing device comprising a dispensing saddle with a static port therein for continual delivery of a first dispersant and a hold for a dispensing pod with the dispensing saddle floatingly supporting itself and an exchangeable dispensing pod therein with the dispensing pod having both a dynamic port and a static port whereby the static port of the dispensing pod provides a continual delivery of a second dispersant and the static port of dispensing saddle provides a continual delivery of a first dispersant to maintain the pool at a safe level when there is no human bather load on the pool. An operator responsive dynamic port in the dispensing pod enables an operator to increase delivery of the second dispersant to thereby respond to an increase in pool microorganisms caused by human use of the pool without having to increase the delivery of the first dispersant from the dispensing saddle. The dispensing pod generating sufficient buoyancy torque so as to rotate both the dispensing saddle and the dispensing pod as the second disperant is consumed to thereby provide a visual indication to replace the dispensing pod with a fresh dispensing pod.

BRIEF DESCRIPTION OF THE DRAWINGS

FIG. 3 is a perspective of a dispensing pod;

FIG. 4 is a side view of the dispensing pod of FIG. 3;

DESCRIPTION OF THE PREFERRED EMBODIMENT

Figure 1:
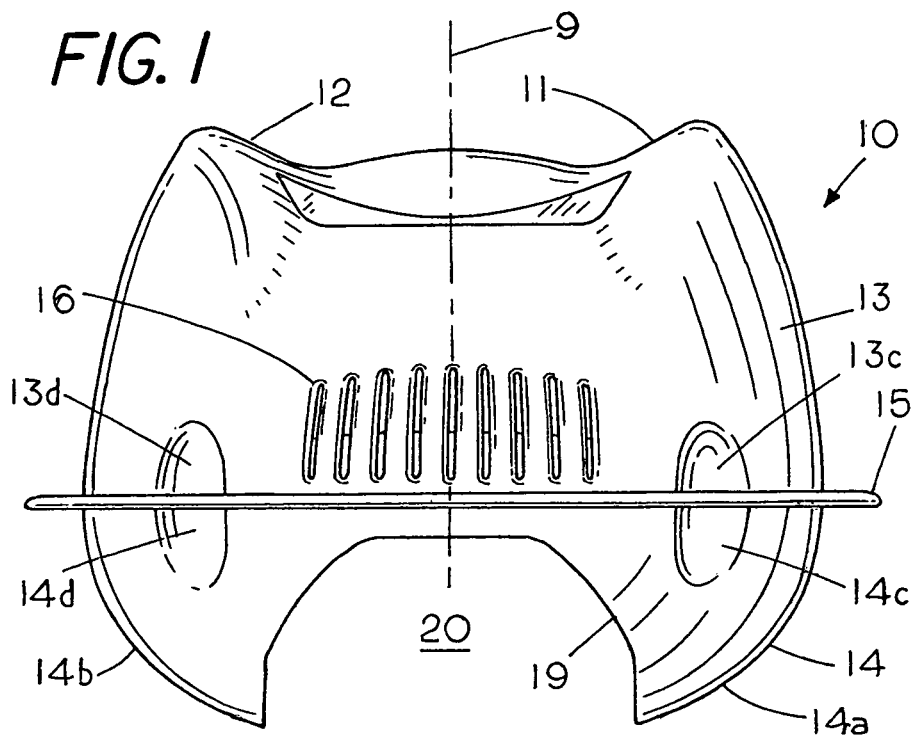
FIG. 1 is a front view of a dispensing saddle for a two part-dispensing device having an open hold for carrying a dispensing pod.
Figure 6:
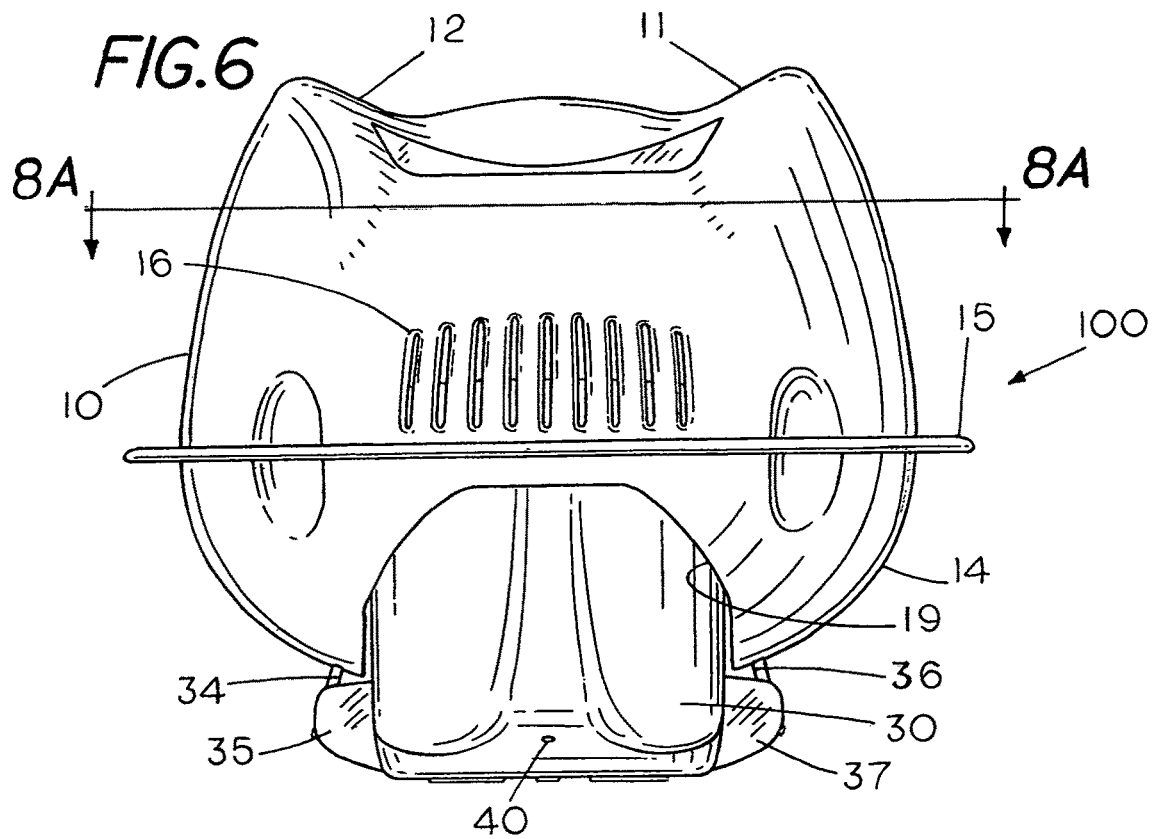
FIG. 6 is a front view of a two-part dispensing device comprising the dispensing saddle of FIG. 1 with the dispensing pod of FIG. 3 located therein.

FIG. 1 is a front view of a dispenser in the shape of a dispensing saddle 10 without a dispensing pod mounted therein and FIG. 6 is a front view of dispensing saddle 10 with a dispensing pod 30 mounted in a belly hold 20 of the dispensing saddle 10 to form a two-part dispensing device 100.

FIG. 1 shows the top portion of dispenser 10 has a hemispherical like shape with a peripheral band 15 that separates the top portion of housing 13 of the dispenser 10 from the bottom portion or housing 14 of the dispenser 10 with the bottom portion of dispenser 10 including a first bottom housing extension 14a and a second bottom housing extension 14b with both the first bottom housing extension and the second bottom housing extension extending transversely from an underside of dispenser 10 to form an open bottom belly hold 20 therein with the first extension and the second extension comprising spaced apart sidewalls for supporting a dispensing pod 30 therebetween.

Dispensing saddle 10 has sufficient flotation to floatingly support both itself and an elongated dispensing pod 30, which is carried in the belly hold 20 of the dispensing saddle 10 as the dispensing saddle 10 and the dispensing pod 30 simultaneously deliver water treatment dispersants to a body of water such as a pool. The two-part dispersant delivery device 100, which is shown in the engaged or assembled state in FIG. 6, is well suited for pools in the 5000 to 10000 gallon range since the dispersant in the dispensing saddle 10 typically lasts a six month pool season while the nonbuoyant dispersant in the dispensing pods can be replaced as needed by merely exchanging a spent dispensing pod with a fresh dispensing pod.

A reference to FIG. 1 shows dispensing saddle 10 contains a top section or housing 13 and a bottom section or housing 14 with extensions 14a and 14b forming an open belly hold 20, which is located in the bottom section 14 of dispensing saddle 10 with the belly hold 20 suitable for receiving and carrying a dispensing pod therein. In the example shown the top housing 13, which contains a water dispersant that retains its mass, has fixed elongated openings 16 on each side for ingress and egress of water into contact with the dispersant therein. In other examples the top housing 13 may be rotateable with respect to the bottom housing 14 to control the port area through elongated ports 16. The top housing 13 of dispensing saddle 10 includes a first ear 11 forming a first finger relief and a second ear 12 forming a second finger relief. In this example the ear 11 and ear 12 extend at a first angle from the dispenser and a side extension 15 comprising a band extends at an acute angle with respect to the angle of ear 11 or 12 with the ear and the side extension spaced from each other so that a user can simultaneously grasp either the ear 11 or ear 12 and the side extension 15 between a finger and a thumb of one hand to enable the user to lift the two-part dispensing device 100 from a body of water.

The bottom housing 14 of dispensing saddle 10 includes a first dimple 13 and a second dimple 13d as well as dimples, which are located on the opposite side of the dispensing saddle, which in some cases may be used for grasping the top housing 13.

The finger relief formed by ear 11 allows a user to grasp and hold the top housing 13 with a thumb while an underside of band 15 can be grasped with a finger, which allows a person to remove the dispensing device 10 from the body of water with one hand. Similarly, the finger relief formed by ear 12, which is on the opposite side of the dispensing saddle 10, and band 15 also permits a person to grasp the two-part dispensing device 10 in on one hand. In the example shown the top dispenser housing 13 and the bottom housing 14 are shown as fixed or integral to each other with dispenser housing 13 having a set of elongated fixed or static dispersant delivery ports 16 that are sized so as to provide for continual delivery of dispersant during a pool season, which typically lasts six months. In other examples the top section of the housing may be rotateable with respect to a bottom housing to change the rate of dispersant delivery therefrom. An example of this type is shown in copending application Ser. No. 13/507,114 filed Jun. 5, 2012, which is herby incorporated by reference.

Figure 2:
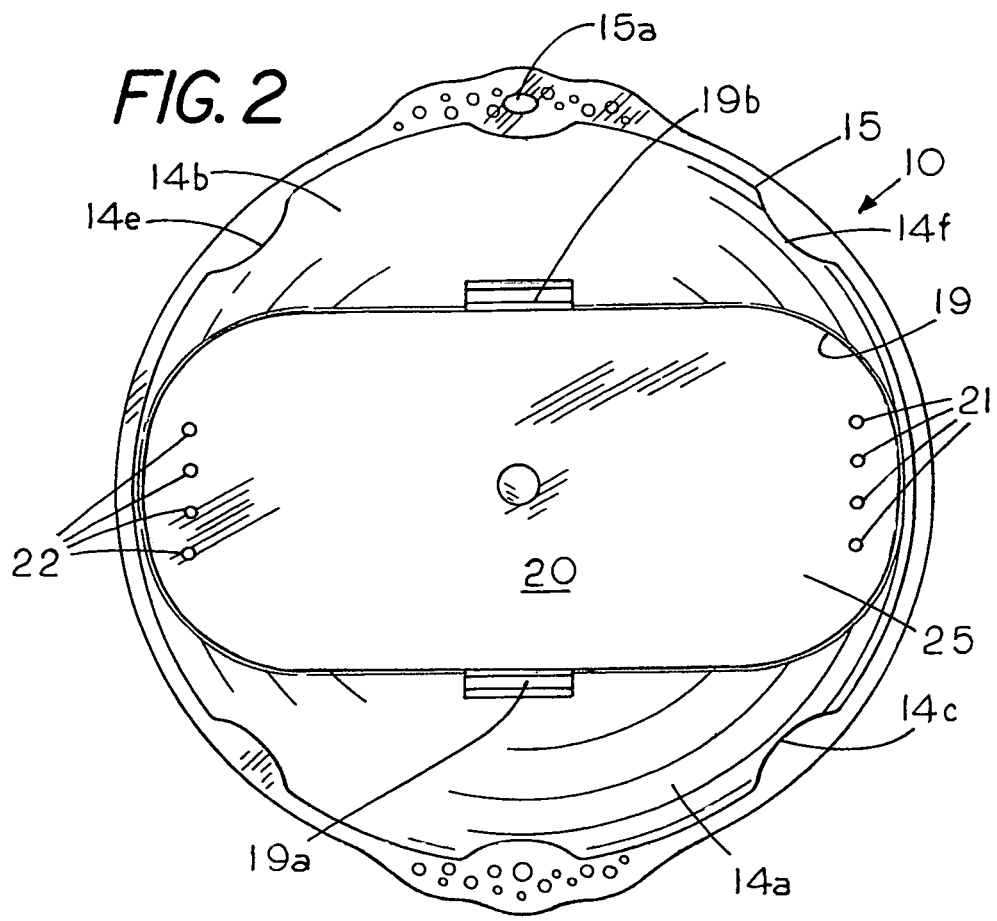
FIG. 2 is a bottom view of the dispensing saddle of FIG. 1.

FIG. 2 shows a bottom view of the dispensing saddle 10 revealing the open belly hold 20 or pocket that has a sidewall 19 and a top member or separator 25 for partially confining a dispensing pod in a dispensing condition therein. Dispensing saddle 10 includes a first extension or wing 14a and a second extension or wing 14b that are part of bottom housing 14. A lip 19a on one side of sidewall 19 and a lip 19b on the opposite side of sidewall 19 form catches for engaging resilient latches on a dispensing pod. Separator 25 of bottom housing 14 includes a set of open ports or vents 21 on one end and a set of open ports or vents 22 on the opposite side. As can be seen in FIG. 2 a peripheral band 15, which extends around the dispensing saddle 10 includes a loop or hole 15a for securing a lanyard and tethering the two-part/dispensing device 100 to a side of a pool to restrain the two-part dispensing device 100 from floating around the pool and interfering with the use and enjoyment of the pool.

Figure 5:
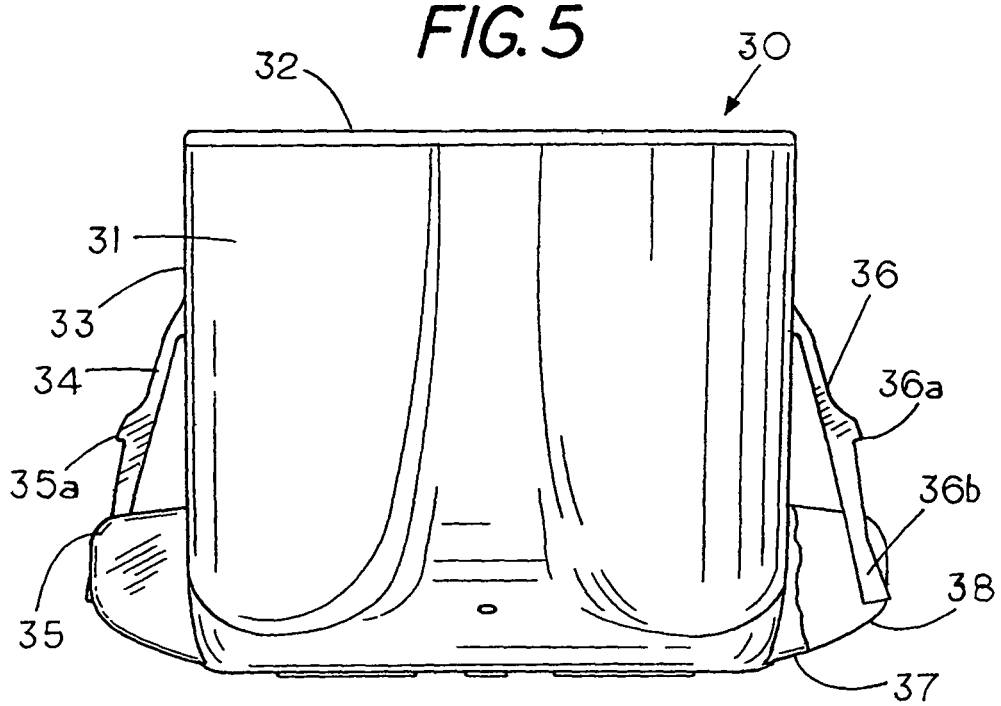
FIG. 5 is an end view of the dispensing pod of FIG. 3.

FIG. 3 is a perspective and isolated view of an elongated dispensing pod 30 for mounting at least partially in the belly hold 20 of the dispensing saddle 10. FIG. 4 is a side view, partially in section of the dispensing pod 30 and FIG. 5 is an end view of the dispensing pod 30 with a latch guard 37 partially removed to reveal a first cantilevered resilient latch 36, which is located between latch guard 37 and latch guard 38. Dispensing pod 30 comprises an elongated container 31 for holding a dispersant a nonbuoyant dispersant such as a halogen therein. The partial sectional view of FIG. 4 shows a first solid chlorine puck 90 and a second solid chlorine puck 91 located on one end of dispersing pod 30 and a third solid chlorine puck 93 and a fourth solid chlorine puck located on the opposite end of the dispensing pod 30. The dispensing pod 30 with the solid chlorine pucks therein lacks floatation as the chlorine pucks and dispensing pod 30 have a specific gravity greater than 1, which normally causes the dispensing pod 30 and its contents to sink to the bottom of the pool if not supported by the buoyancy of the dispensing saddle 10 of FIG. 1. While dispensing pod 30 lacks flotation the dispensing pod 30 includes a rotateable control valve 45 that can be rotated to increase or decrease the open area in dynamic port 43 and dynamic port 44 and hence water access to the dispersant therein. Rotatable control valve 45 becomes a convenient external finger engageable knob to change the delivery rate of a dispersant from the dispensing pod 30 without removing the dispensing pod from the dispensing saddle 10. A bezel 46 contains numbers for providing a reference for a dynamic port setting. In this example a decorative stipple pattern 47 is located on the control valve 45.

Figure 7:
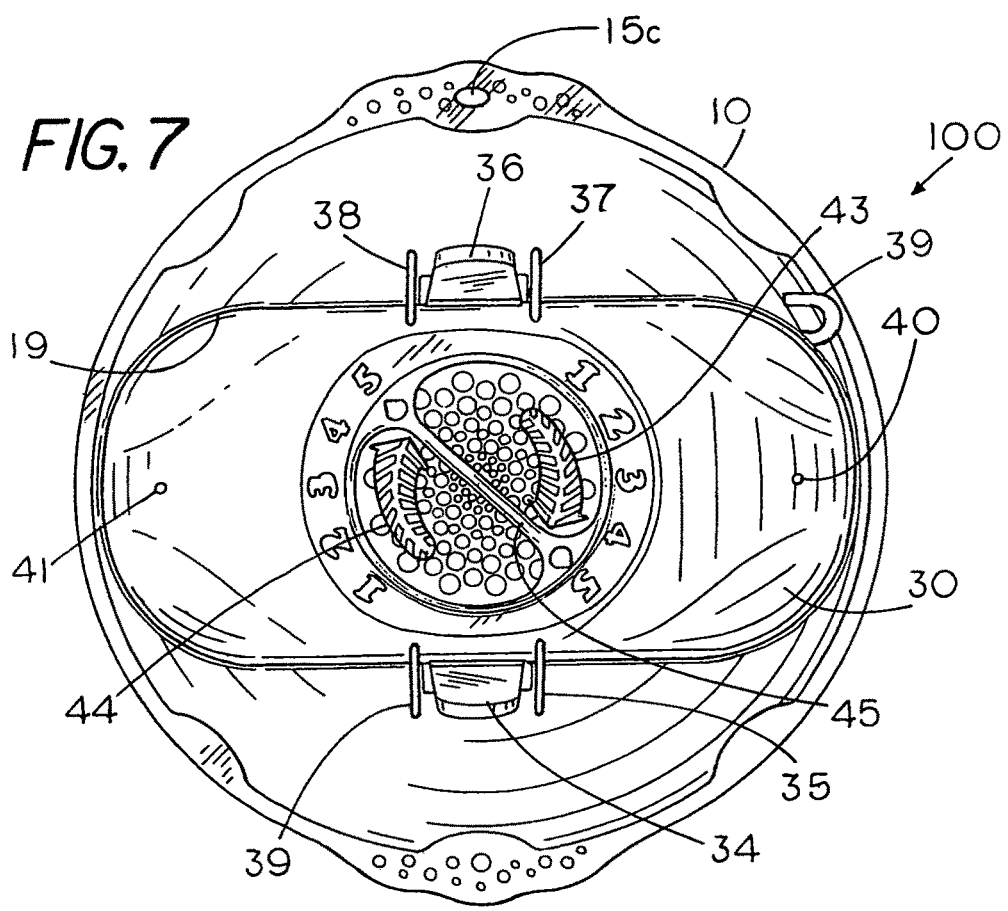
FIG. 7 is a bottom view of the two part-dispensing device of FIG. 6.
Figure 12:
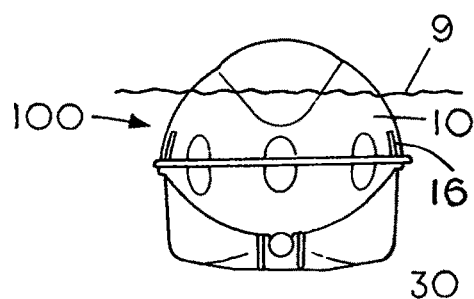
FIG. 12 shows the two-part dispensing device floating with respect to a water line immediately after the nonbuoyant dispersant in the dispensing pod has been placed in a pool.

As shown in FIG. 3 and FIG. 7 the dispensing pod 30 includes a dynamic port comprising a variable size inlet port 43,44 for controlling an ingress and egress of water therethrough and a static or fixed sized ports 40 and 41 for delivery of a dispersant therefrom. The dispenser or dispensing saddle 10 also includes a set of static or fixed size openings comprising a set elongated ports 16 on each side of dispensing saddle 10 to provide for ingress and egress of water into contact with a dispersant therein. In the example described herein the dispersant in dispenser 10 retains its mass as it kills harmful organisms through the delivery of metal ions such as silver ions or copper ion to the body of water. The dynamic port, which comprise a variable or controllable inlet 43,44 of the dispensing pod 30, is located on an exposed condition on the underside of the dispensing pod 30 as the dispensing pod is floatingly supported in the dispenser 10 (FIG. 12). In this example the opening 16 in the dispenser 10 is located below a water line 9 but above the dispensing pod 30 when the nonbuoyant dispersant in the dispensing pod 30 is in an unspent condition. The dispersant in dispensing pod 10 may be a halogen such as chlorine or bromine in solid or granular form.

Figure 15:
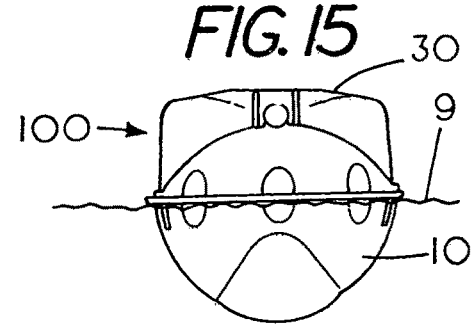
FIG. 15 shows the two-part dispensing device floating with respect to a water line after the nonbuoyant dispersant in the dispensing pod has been consumed.

The two-part dispensing device 100, which is shown in FIG. 6 and FIG. 7, includes dispensing pod 30 with a variable control valve 45 for controlling an ingress and egress of water through dynamic ports 43 and 44 and a fixed or static ports 40,41 that remain in an open condition during a pool season. The dispenser 10, which supports dispensing pod 30, also includes a set of elongated static or fixed area ports 16 on each side of the dispenser with the static port 16 of the dispenser saddle 10,41 remain in an open condition during a pool season. In this example the static ports 40,51 of the dispensing pod 30 are selected based on a six-month pool season. Also in this example the dynamic ports 43,44 of the dispensing pod 30 are located on an underside of the dispensing pod 30 and below a water line 9 as the dispensing pod is floatingly supported in the body of water. The static or fixed elongated ports 16 in the dispenser saddle 10 are located below a water line 9 but above the static port 40,41 in the dispensing pod 30. In this example both the static and the dynamic ports for the nonbuoyant dispersant in the dispensing pod 30 remain below a water line when the nonbuoyant disperant therein is in an unspent condition. FIG. 15 illustrates the relationship of the elongated static ports of the dispensing saddle or dispenser 10 and the ports of dispensing pod 30 to a water line 9 when the dispersant in dispensing pod 30 is spent. As can be seen in FIG. 15 the static elongated ports 16 remain below the water line to enable dispensing saddle 10 to continue to deliver metal ions to the body of water even though the disperant in dispensing pod 30 may be spent.

FIG. 3 shows that located on one end of dispensing pod 30 is a static port comprising a vent or fixed area port 41 and on the opposite end is a further vent or fixed area port 40 that provides static openings for a slow release of dispersant from within the dispensing pod 30 to maintain dispensing pod 30 in a continual dispensing condition when the dispensing pod 30 is located in a body of water. While two static ports 40 and 41 are shown in dispensing pod 30 to provide a minimum dispensing rate more or less static ports may be located in the dispensing pod 30 to have a higher or lower minimum fixed dispensing rate. That is, one can limit or increase the minimum disperant rate depending on the size of the pool and the length of the pool season by merely having a dispensing pod with more static ports or larger or smaller static ports.

A feature of the invention described herein is that both the dispensing saddle 10 and the dispensing pod 30 contain a set of static ports which are fixed or open ports with the dispensing pod 30 also including dynamic ports 43 and 44 which are adjustable in size to increase of decrease the delivery of a dispersant from the dispensing pod 30. In this example the static or fixed open ports 40,41 provide chlorine dissipation from dispenser pod 30 even if the adjustable ports 43 and 44 are in a closed condition. For example, it has been found that with static ports ranging from 0.050 inches to 0.080 inches and having a total area of 0.048 square inches the rate of release of a halogen such as chlorine from the dispensing pod 30 is sufficient to maintain a 5000 gallon pool during non load conditions i.e. when the pool is not in use. The static ports 40, 41 provide a constant continual release of dispersant thus making it easier for the pool owner to reset a residual chlorine dispersant rate that maintains the pool by merely closing the valve 45 to close dynamic ports 43 and 44.

FIG. 5 shows pod 30 has a flattop or cover 32 having a top side for mating with a flat underside of separator 25 in dispensing saddle 10 so that the dispensing pod 30 can be snugly retained within the three sides of the belly hold 20 in the dispensing saddle 10. In this example the dispensing pod cover 32 is mechanically secured to an interior sidewall of housing 31 through internal hooks and latches on the cover 32 on the inside of the housing 31 with the internal hooks (not shown) that snap into place as the cover is pushed onto the housing to thereby lock cover 32 to the dispensing pod 30 and prevent a person from accidentally opening the dispensing pod 30 and coming into contact with the dispersant therein.

Located on one side of dispensing pod 30 is a cantileverly mounted resilient latch 34 having a hook 35*a* for engaging a lip 19*b* (FIG. 2) in an extension or wing 14*b* of dispensing saddle 10 and similarly located on the opposite side of dispensing pod 30 is a second cantileverly mounted resilient latch 36 having a hook 36*a* for engaging a lip 19*a* (FIG. 2) in an extension or wing 14*a* of dispensing saddle 10. Latch 34 and latch 36 allow one's fingers to quickly attach or remove dispensing pod 30 from dispensing saddle 10 without coming into contact with the dispersant in the dispensing pod 30.

FIG. 5 shows dispensing pod 30 includes a latch guard 38 and a latch guard 37 (partially cutaway) extending outward from dispensing pod 30 to prevent the resilient latch 36 from being accidentally disengaged as well as from being deformed during storage. Similarly, a latch guard 35 and a latch guard 39 on the opposite side of dispensing pod 30 (FIG. 3) extend outward from dispensing pod 30 to prevent the latch 34 from being accidentally disengaged as well as from being deformed during storage.

As shown in FIG. 3 and FIG. 4 the dispensing pod 30 includes a set of finger releasable resilient cantilevered latches 34,36 with one of the set of finger releasable cantilevered latches located on a one side of the dispensing pod 30 and the other of the set of finger releasable cantilevered latches located on an opposite side of the dispensing pod 30 with each of the resilient cantilevered latches cantilevered outward from the top of the dispensing pod for resiliently retracting in response to sliding the dispensing pod 30 into the open hold 20 of the dispenser saddle 10. A set of latch guards, 35,37, and 35,39 shield the latches 34 or 36 from accidently opening through the proximate of the latch guards to each of the set of finger releasable cantilevered latches 34 and 36. In this example the set of releasable cantilevered latch guards are laterally spaced from the releasable cantilever latches 34 and 36 so as not to interfere with a compressible release of the dispensing pod 30 from engagement with the dispenser saddle 10 as one squeezes the releasable cantilevered latches 34,36 between a finger and a thumb of a user.

Figure 5A:
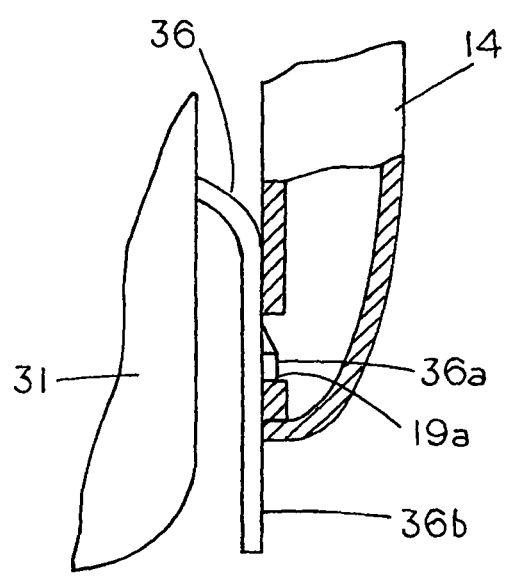
FIG. 5A is a partial sectional view showing a latch on the dispensing pod in engagement with an extension of the dispensing saddle.

FIG. 5A illustrates the engagement of resilient latch 36 with a lip 19*a* on the wing or extension 14 of dispensing saddle 10. FIG. 5A, which is a partial sectional view shows latch 36 on the dispensing pod 30 in locking engagement with a lip 19*a* on a wing 14 of the dispensing saddle 10. In this example the resilient latch 36 has been forced inward toward the dispensing pod 30 so that the latch hook 36*a* can engage the lip 19*a* and be maintained in engagement therewith by the resiliency of the latch thus preventing the disengagement of the dispensing pod 30 from the dispensing saddle 10. As the function of latch 36 and 34 are the same only one is described herein. As shown in FIG. 5A the resiliency of the latch 36 maintains the hook 36*a* in resilient engagement with lip 19*a* on one side of the dispensing saddle 10 and similarly hook 35*a* on the opposite side of dispensing pod 30 is maintained in resilient engagement with an identical lip 19*b* (FIG. 2) on the opposite side of the dispensing saddle 10 to enable the dispensing pod 30 to be securely held within the belly hold 20 of the dispensing saddle 10 through the coaction of the snug fit between the interior sidewall 19 of the dispensing saddle and the exterior surface of housing 31.

FIG. 6 is a front view of the two-part dispensing device 100 containing the dispensing saddle 10 of FIG. 1 with the dispensing pod 30 located partially within the belly hold 20 of the dispensing saddle 10 but latched to the dispensing saddle so the dispensing saddle and elongated can be handled as a single unit. In this example the two-part dispensing device has sufficient buoyancy to support both the dispensing saddle 10 and the dispensing pod 30 even though dispensing pod 30 contains a nonbuoyant dispersant for example chlorine. The weight of the nonbuoyant dispersant in the dispensing pod 30 is insufficient to cause the two part dispensing device 100 to sink but the weight is sufficiently heavy so as to cause the two-part dispensing device 100 to float in an upright condition (FIG. 12) i.e. the separable two-part dispensing device 100 becomes bottom heavy when the dispensing pod 30 is in the filled state.

To illustrate the cooperative feature of the dispensing saddle 10 and the dispensing pod 30 the weight of the dispensing pod 30 in an empty or spent state is designated as $W_e$ and the weight of the dispensing pod 30 in the full state is designated $W_f$. For example, if $W_e$ is 129 grams $W_f$ is 934 grams and the buoyant force that would submerge dispensing saddle 10 without the dispensing pod 30 attached thereto is $F_e$, which is 398 grams. In this example the dispensing pod 30 contains a stack of chlorine pucks that gradually dissipate in the presence of water that enters the dispensing pod 30 through ports 43 and 44 in a hand adjustable valve 45 (FIG. 3) as well as other fixed ports on the dispensing pod 30. When dispensing pod 30 is in an unsubmerged state the weight of the dispensing pod and chlorine pucks is 934 grams, however, when the dispensing pod 30 is submerged in the body of water the buoyancy forces on the dispensing pod 30 cause the weight of the dispensing pod to have an effective weight or downward force of only about 332 grams on the dispensing saddle 10. Since the effective weight of 332 grams is less than the buoyant submersion force $F_e$ of 398 grams the dispensing saddle 10 and the dispensing pod 30 float in the body of water as a two-part dispenser 100 (FIG. 12). However, since the weight of the dispensing pod 30 is on the bottom and offset from the flotation which is in dispensing saddle 10 the dispensing saddle 10 and dispensing pod 30 float in a partially submerged condition but in an upright condition as shown in FIG. 12. As the chlorine in the dispensing pod 30 dissipates and the weight in the dispensing pod 30 lessens the downward force on the two-part dispensing device 100 and the torque on the dispensing device 100 changes since the offset weight offset weight 70 in the dispensing saddle 10 (FIG. 8A) remains constant while the weight in the dispensing pod decreases. As a result of the continuing depletion of the chorine in the dispensing cartridge or dispensing pod 30 the two-part dispensing device 100 alters the floatation torque on the two-part dispensing device 100 causing the saddle 10 and pod 30 to begin to rotate from the upright state shown in FIG. 12 to an eventual inverted position as shown in FIG. 15 which shows the position of the dispensing pod 30 in a spent condition.

Dispensing pod 30 is removable mounted in belly hold 20 to enable one to quickly and easily exchange a spent dispensing pod 30 for a fresh dispensing pod. For ease in insertion of the dispensing pod into the belly hold 20 as well as preventing the dispensing pod 30 from moving about in the dispensing saddle 10 the clearance between the sides of the dispensing pod and the sidewall 19 of the dispensing saddle typically range from about 0.013 inches to 0.020 inches thus allowing one to easily remove and replace the dispensing pod 30 without concern for the dispensing pod binding with sidewall 19. In addition the sides of the dispensing pod 30 and the sidewall 19 may be drafted away from each other so that the distance between the surfaces proximate each other increases as one gets farther away from the contact between top 32 and bottom member 25 of the dispensing saddle 10. This feature further reduces opportunity for binding during replacement of a dispensing pod 30.

FIG. 7 is a bottom view of the two-part dispensing device 100 of FIG. 6 with the dispensing pod 30 located therein to reveal the resilient members 34 and 36 which are engaged with lips in the separable dispensing saddle 10 to hold the dispensing pod 30 in a dispensing position so that the dispensing saddle 10 and the dispensing pod 30 can simultaneously deliver dispersant to a body of water as the dispensing saddle 10 and the dispensing pod 30 float as an integral unit, i.e. as a two-part dispenser 100.

Located on the underside of dispensing pod 30 is a first arc like opening 44 and a second arc like opening 43 with a rotateable disk valve 45 creating a dynamic port that allows one to increase or decrease the port area into and out of the dispensing pod by varying the size of the openings. Dispensing pod 30 include a set of vent holes 40 and 41 or fixed area water ports forming a static port which permits dispersant to be delivered when the valve 45 is in the closed condition. Typically, the amount of chlorine released when in the closed condition i.e. that is through the static ports or vent holes 40 and 41 and vent holes in top 32 is sufficient to maintain a 5000 gallon pool when there is no swimmer load in the pool. However, when swimmers use the pool the valve 45 can be rotationally adjusted to increase the dynamic or open port area proximate ports 43 and 44 to thereby increase the rate of release of dispersant, in this example chlorine into the pool.

Thus, a feature of the invention is that if the nonbuoyant dispersant in the dispensing pod 30 comprises a halogen and the dispensing pod includes static halogen ports 40,41 that remain in an open condition the static ports 40,41 continually release halogen from the dispensing pod 30 even though the dynamic or variable ports 43,44 of dispensing pod 30 may be in a closed condition. A benefit of the use of both static and dynamic ports in the dispensing pod is that water treatment can be simplified thus reducing opportunities for growth of harmful organism in the pool. For example, with the dynamic ports 43,44 in a closed condition, the size of static halogen ports 40,41 in the dispensing pod 30 are selected so as to normally deliver sufficient halogen from static ports 40 and 41 to maintain a swimming pool of at least 5000 gallons in a sanitized condition when there is no human activity in the swimming pool and a dispersant such as a source of silver ions is also available through a static port in the dispensing saddle 10.

A further feature of the invention is the static sizing of the fixed ports in the dispensing pod 30 to eliminate the need to change disperant rates when the pool is not in use. That is the size of the open fluid ports are selected based on the size of the swimming pool as well as the length of the pool season in order to allow a pool owner maintain the pool in a safe condition.

A further feature of the invention is that the pool owner can match the size or area of the static dispensing ports in the dispensing pod to the volume of water in the pool. For example, one pool may have a dispensing pod 30 with one set of static or open fluid ports and a second larger pool may have a set of static or open fluid ports of larger area in order to provide the needed minimum delivery rate of the halogen into the body of water when the control valve on the dispensing valve is in the closed condition. Thus pools of larger or smaller volume can be automatically maintained when not in use by the invention described herein since the static dispensing rate can be matched to a needed minimum dispensing rate that maintains the pool in a safe condition when the pool is not subject to human recreational use.

Figure 8:
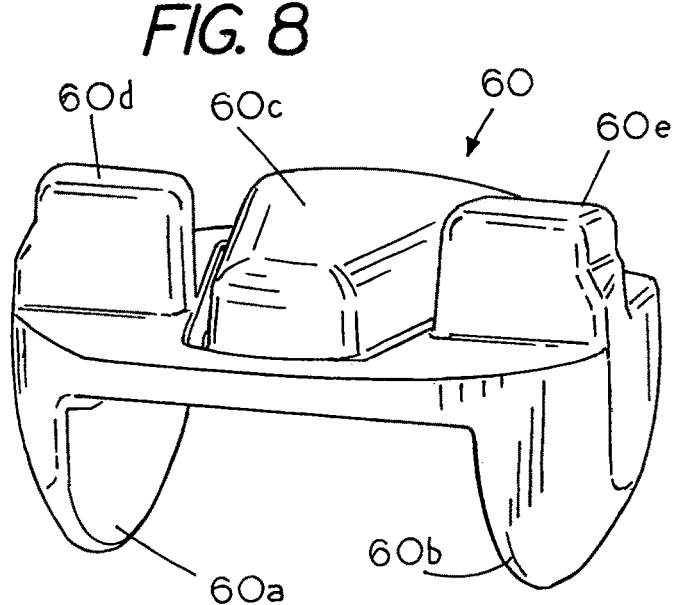
FIG. 8 is a perspective view of a float located in the dispensing saddle of FIG. 1.
Figure 9:
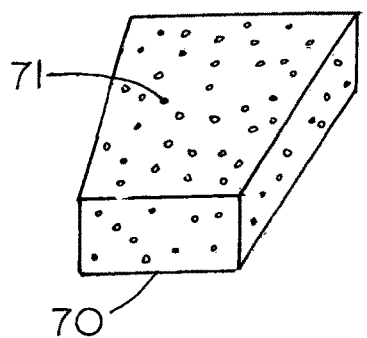
FIG. 9 is a perspective view of a porous dispenser for mounting in the dispensing saddle of FIG. 1.

FIG. 8 is a perspective view of a float 60 located within the dispensing saddle 10 of FIG. 1 with the float configured to fit within an open region within the dispensing saddle 10 to thereby provide flotation to the dispensing saddle 10. In this example the float 60 comprises a lightweight non-water absorbent material such as Styrofoam with the float having a wing 60a and a wing 60b that extends downward and posts 60e and 60d that extend upward. Float 60 may be made from other materials and other shapes without departing from the spirit and scope of the invention. Located in the center of float 60 is a trapezoidal shaped pad 60c, which provides support for a dispersant pack 70, which is shown in FIG. 9.

In this example flotation insert 60 has the ballast or dispersant pack 70 located above the flotation insert 60 (FIG. 8A) with a center of mass $c_m$ of the ballast offset from a central axis 9 of the dispenser 10 to provide a rotational torque to the dispensing device 100. However, when the dispensing device is floating in a body of water the torque applied to the dispensing device 10 by the disperant pack 70 is insufficient to rotate the dispensing device 10 if the nonbuoyant dispersant in the dispensing pod 30 is in an unspent condition. In addition the dispersant pack 70 is located in a top portion of dispensing saddle 10 so that the dispensing saddle 10 would invert 180 degrees from the position shown in FIG. 1 if the dispensing saddle 10 were placed in a body of water without a dispensing pod therein.

Typically, dispersant pack 70 comprises a dispersant such as a batch of minerals or the like, which may be in granular form, that retains its weight as it releases ions into the pool to participate in the treatment of the water in the pool. In operation of the dispensing saddle 10 the dispersant pack functions as a permanent ballast since the weight of the dispersant pack 70 remains substantially unaffected by the release of ions from the dispersant pack 70. One example of a suitable ballast that functions as a dispersant that removes unwanted organisms from a pool or other body of water are the minerals and the source of silver ions, which are sold by King Technology Inc. of Hopkins Minnesota. The silver chloride in the King Technology dispersant releases silver ions to kill unwanted organisms while the mineral retaining its mass to enable rotation of the dispenser as the nonbuoyant dispersant is consumed. Other suitable ballast dispersants may be used without departing from the spirit and scope of the invention.

Figure 8A:
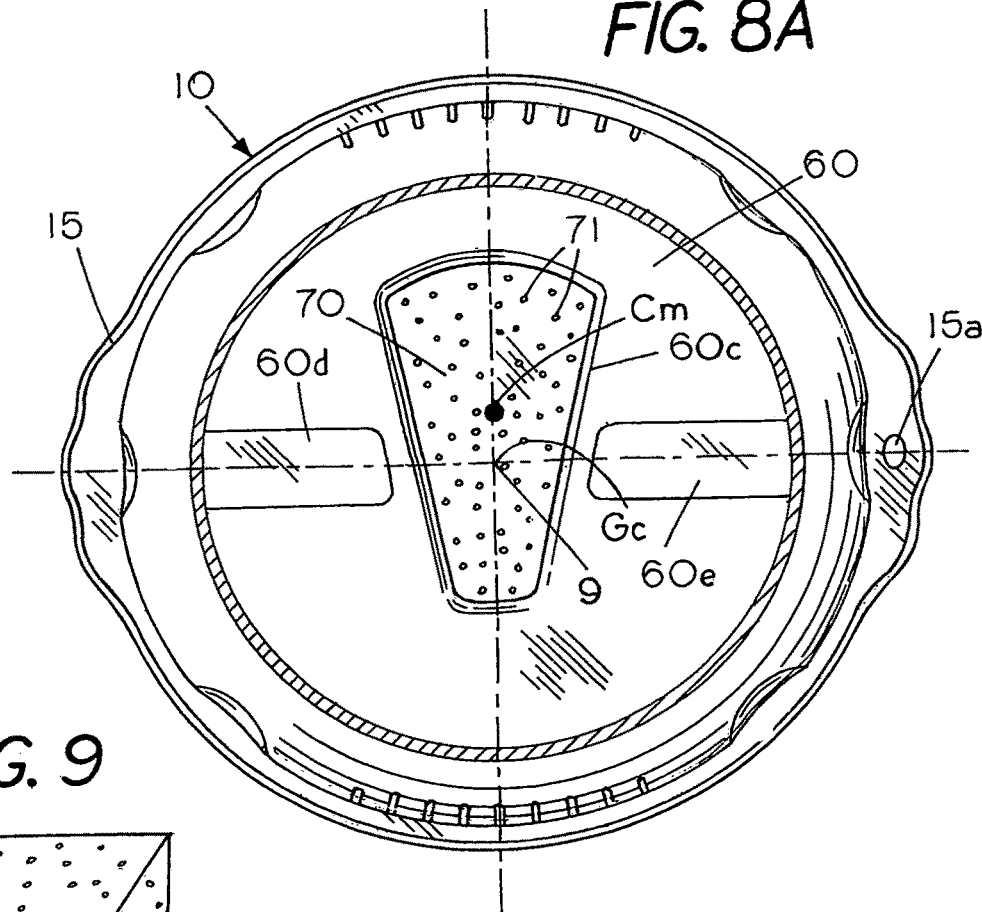
FIG. 8A is a sectional view of the two-part dispensing device taken along lines 8A-8A of FIG. 6.

In the example shown the dispensing saddle 10 has a fixed rotational bias through an off center of the dispensing pack 70 with respect to a vertical axis through the dispensing saddle. A reference to FIG. 8A shows the float 60 in the top portion of dispensing saddle 10. The center of gravity of the dispensing saddle without the presence of the dispensing pack 70 is central axis $G_C$. Located on top of the float 60 is the dispensing pack 70, which contains a batch of minerals with the batch of minerals, having a center of mass $C_M$ that is a distance from the central axis $G_C$ of the dispensing saddle 10. The weight of the minerals acts as a ballast and as a result the dispensing saddle 10 has a fixed rotational bias to one side, however when the dispensing pod 30 is full the fixed rotational bias is insufficient to rotate the dispensing saddle and dispensing pod 30 from an upright condition as shown in FIG. 12. As the dispersant in the dispensing pod 30 gradually dissipates the torque generated by the dispensing pod decrease while off center of dispenser pack 70 remains the same. Gradually, the net torque due to the dispensing pod is overcome by the torque from the dispensing pack 70, which causes the dispensing saddle 10 and dispensing pod 30 to rotate to the positions as illustrated in FIG. 12- to FIG. 15. Thus, the two-part dispensing device comprises a dispensing saddle 10 and the dispensing pod 30 secured to the dispensing saddle so that the dispensing saddle 10 and the dispensing pod 30 rotate as a unit in the body of water as the nonbuoyant dispersant in dispensing pod 30 is consumed thereby visually alerting an operator to replace the nonbuoyant dispersant.

Suitable lightweight materials for the dispensing saddle 10 and the dispensing pod 30 include polymer plastics such as polypropylene and acrylonitrile butadiene styrene.

Figure 10:
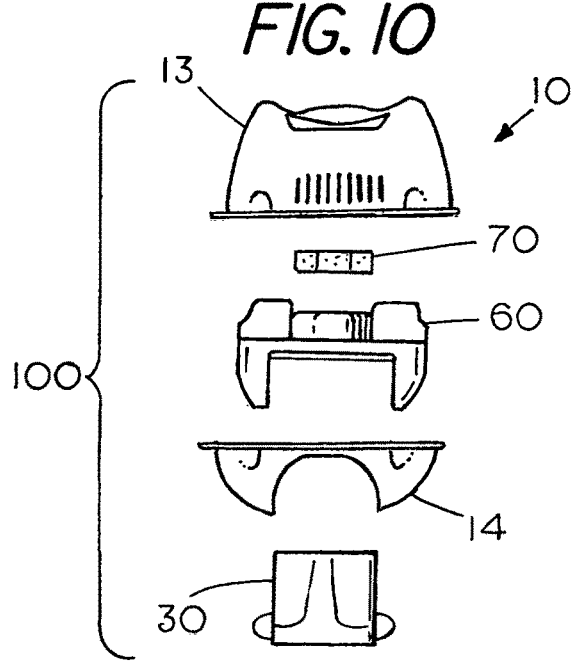
FIG. 10 is an exploded view of the two part-dispensing device.

To illustrate the assembly and composition of the dispensing saddle 10 and dispensing pod 30 reference should be made to FIG. 10 which shows the top section 13, the dispersant pack 70, the float 60, the lower section 14 and the dispensing pod 30 in an exploded view. The above components can be brought together to form a two-part dispensing device 100 comprised of dispensing saddle 10 and a dispensing pod 30 each of which can deliver a dispersant to a body of water while they float as a unit that is supported only by the buoyancy of the dispensing saddle 10.

Figure 11:
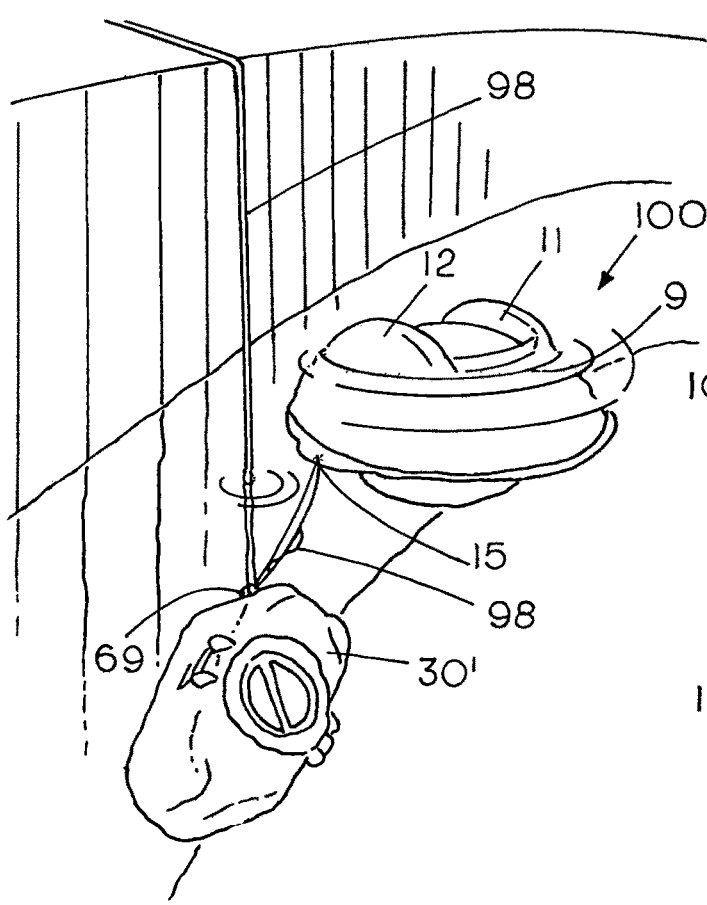
FIG. 11 is a perspective view of the two part-dispensing device tethered to a pool with a nearly spent dispensing pod attached to the tether.

FIG. 11 is a perspective view of the two-part dispensing device 100 floating in a pool with the two-part dispensing device 100 tethered to the pool by a lanyard 98. Clipped to lanyard 98 by clip 69 is a nearly spent dispensing pod 30. The purpose of attaching the nearly spent dispersing pod 30' to the lanyard 98 attached to the pool wall and the two-part dispensing device 100 is two fold, first it allows any remaining chlorine in the dispensing pod 30' to be discharged into the body of water without wasting the chorine or creating a hazardous condition and secondly the clip 69 on the side of the dispensing pod 30 insures that the neither the dispensing pod 30' or the two part dispensing device 100 do not float around the pool and create a nuisance for persons using the pool. When the material in the dispensing pod 30' is completely spent the dispensing pod 30' can be removed and discarded. Thus a feature of the invention is the ability to safely dispose of any remaining chlorine in a dispensing pod when the dispensing pod is replaced with a fresh dispensing pod.

To reveal the typical operation of the dispensing saddle 10 and dispensing pod 30 when the two are attached to each other as an integral unit or a two-part dispensing device reference should be made to FIG. 12 to FIG. 15 which illustrates how the dispensing saddle 10 and dispensing pod 30 float in a body of water as the dispersant in the dispensing pod 30 is consumed while the dispersant in the dispensing saddle 10 maintains it weight as it releases metal ions. In this example the dispersant in the dispensing saddle 10 is minerals, which release ions, and the dispersant in the dispensing pod 30 is a halogen such as chlorine, which is consumed as it disinfects the body of water.

Figure 13:
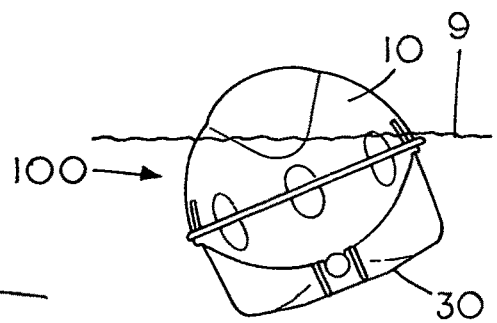
FIG. 13 shows the two part-dispensing device floating with respect to a water line after a portion of the nonbuoyant dispersant in the dispensing pod has been consumed.

FIG. 12 shows the dispensing saddle 10 and dispensing pod 30 floating with respect to a water line 9 when the nonbuoyant dispersant in the dispensing pod 30 is in the full condition and FIG. 13 shows the dispensing saddle 10 and dispensing pod 30 floating with respect to the water line 9 after a portion of the nonbuoyant dispersant in the dispensing pod 30 has been consumed.

Figure 14:
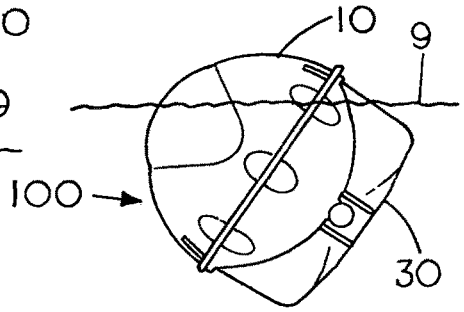
FIG. 14 shows the two-part dispensing device floating with respect to a water line after a further portion of the nonbuoyant dispersant in the dispensing pod has been consumed.

FIG. 14 shows the dispensing saddle 10 and dispensing pod 30 floating with respect to the water line 9 after a further portion of the nonbuoyant dispersant in the dispensing pod 30 has been consumed and FIG. 15 shows the dispensing saddle 10 and dispensing pod 30 floating with respect to a water line 9 after the nonbuoyant dispersant in the dispensing pod has been consumed.

As can be seen in FIG. 12 though 15 the consumption of the nonbuoyant dispersant in the dispensing pod 30 causes the center of gravity to shift causing the dispensing saddle 10 and dispensing pod 30 to gradually invert 180 degrees and thus alert an operator to replace the dispensing pod 30 with a fresh dispensing pod.

A feature of the invention is that the two-part dispensing devices provides multiple water treatment options as various dispersant may be used in the dispensing saddle 10 and the dispensing pod 30. For example, the dispensing saddle 10 may contain a source of silver ions to enable silver ions to be deliverable to a body of water such as a pool while a dispersant such as chlorine is supplied from dispensing pod 30, which is attached to the dispensing saddle 10. The dispensing pod 30 may not be limited to chlorine tablets and may contain different dispersants depending on the task at hand including other halogens, algaecides, shock dispersants or other water treatment materials. A shock dispersant usable in the two-part dispenser 100 may include, although no limitation thereto is intended, one or more of the following monopersulfate, dichloroisocyanuric, soda ash or bicarbonate with a weak acid, dichloroisocyanuric with or without a clarifier and sodium bromide.

The dispensing pod 30 in the two-part dispenser 100 may also contain a dispersant for affecting a pH of the body of water. For example one may have soda ash for increasing pH of the water and another dispenser may contain citric acid or muriatic acid for decreasing pH. Still other materials, which may be carried by the dispensing saddle 10 or the dispensing pod 30 include a clarifier, sodium bicarbonate citric acid, an algaecide or a phosphate remover. As envisioned herein the two-part dispensing device 100 becomes a platform that allows a consumer to create a variety of water treatments through selective replacement of either the dispensing pod or the dispensing saddle.

An example of a non-buoyant water dispersant is, a source of metal ions that kills harmful organisms. One such source of metal ions may be found in the mineral pack sold by King Technology of Hopkins Minnesota.

We claim:

1. A method of water treatment of a pool comprising: placing a separable dispensing device having a first dispersant in a first housing and a second dispersant in a dispensing pod that is attached to an underside of the first housing in a body of water; allowing the separable dispensing device to float in a first orientation with only a top portion of the separable dispensing device located above a water line; and visually determining that the second dispersant in the dispensing pod has been dissipated or nearly dissipated by observing the floating orientation of the separable dispensing device in the body of water; removing the separable dispensing device from the body of water; removing the dispensing pod with the dissipated or nearly dissipated second dispersant replacing the dispensing pod with the dissipated or nearly dissipated second dispersant with a fresh dispensing pod; securing the separable dispensing device within the pool with a flexible line to restrain the separable dispensing device from floating around the pool; and suspending the dispensing pod which may contain a nearly dissipated second dispersant to the flexible line to enable any residual dispersant remaining within the dispensing pod to dissipate into the pool.

2. The method of water treatment of claim 1 including a step of applying the water treatment to a pool ranging as small as 5000 gallons and as large as 10000 gallons.

3. A dispensing saddle having a separator with a housing located on a first side of the separator and a set of extensions located on the opposite side of the separator with a float located in the first housing and a belly hold formed by the set of extensions wherein the weight of a non-buoyant water dispersant causes the dispensing saddle to float with the set of extensions extending upward when the belly hold is empty.

4. The dispensing saddle of claim 3 wherein the housing includes the non-buoyant water dispersant which retains its weight as it delivers the non-buoyant water dispersant and a belly hold that contains a non buoyant dispensing pod with a water dispersant material wherein the weight of the water dispersant material in the dispensing pod causing the dispensing saddle to float with the set of extensions extending downward in the water.

5. The dispensing saddle of claim 4 wherein the water dispersant material in the dispensing pod comprises chlorine and dissipation of the chlorine rotates the set of extensions from a below water position to an above water position in response to consumption of the chlorine.

6. The dispensing saddle of claim 5 wherein a center of mass of the non-buoyant water dispersant is offset from a geometric center of the first housing to provide a rotational torque to the housing and the non-buoyant water dispersant comprise minerals.

\* \* \* \* \*